Oct. 19, 1937.  A. H. NEILSON  2,096,525
FISHING TOOL
Filed March 9, 1936
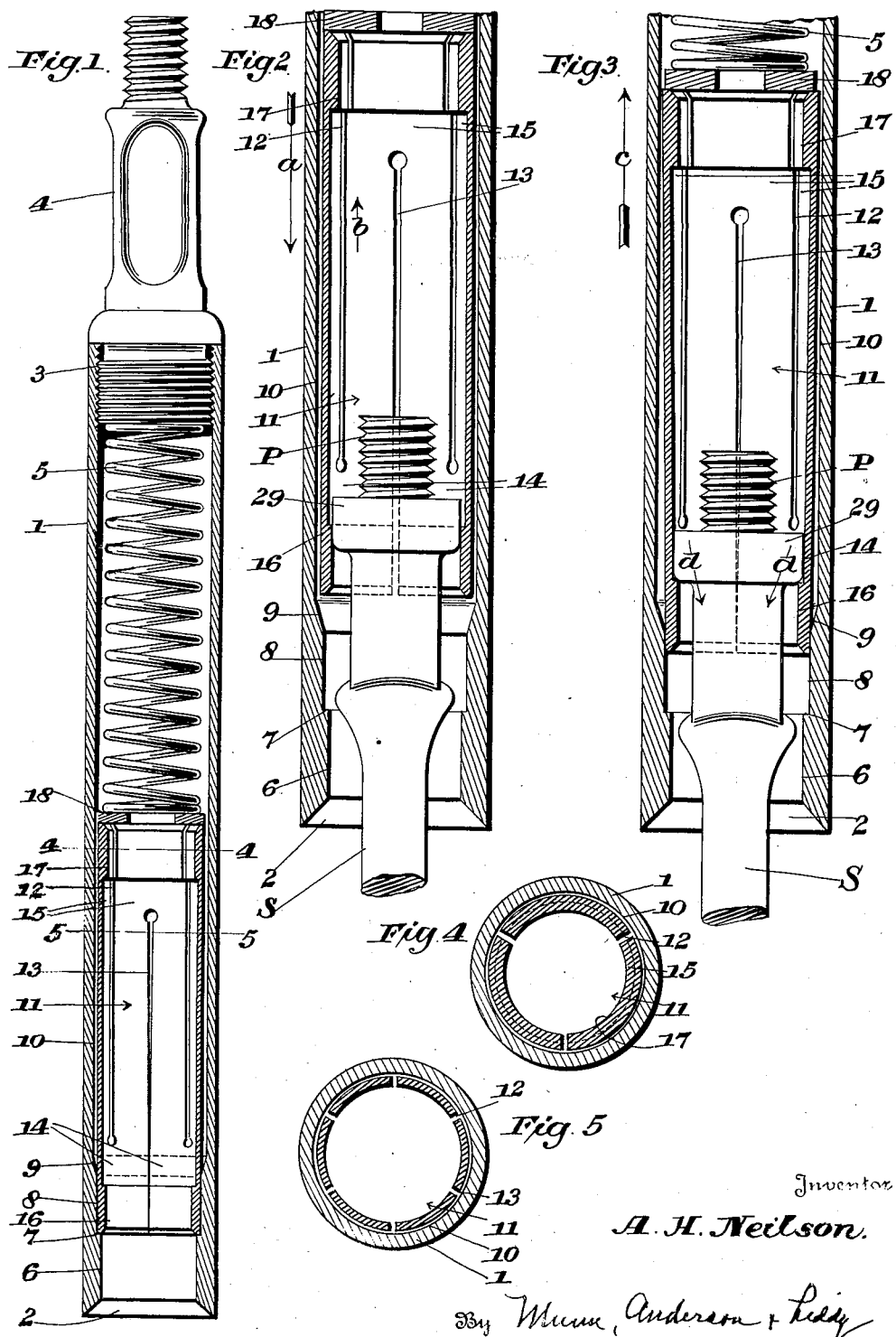
Inventor
A. H. Neilson.
By Munn, Anderson & Liddy
Attorney Patented Oct. 19, 1937

2,096,525

UNITED STATES PATENT OFFICE 2,096,525

FISHING TOOL

Albert H. Neilson, Tulsa, Okla.

Application March 9, 1936, Serial No. 67,983

4 Claims. (Cl. 294—99)

This invention relates to improvements in fishing tools such as are commonly used for catching lost sucker rods and the like from deep wells, and its objects are as follows.

First, to provide a fishing socket which has a reversible, one-piece slip of a type capable of holding the modern kinds of extremely hard pins and boxes, the reversibility and structure of the foregoing slip enabling the oil well operator to catch at least two sizes of either pins or boxes and thus avoid the expense of a separate slip for every size.

Second, to make said slip in the form of a sleeve which is evenly expansible and contractible, at both ends, and devoid of any rigid annular shoulder at either end that would prevent yielding.

Third, to form the slip as a tube which is annularly divided into a plurality of alternately oppositely directed gripper prongs, the extremities of the tube being uniformly yieldable and each extremity being adapted to catch a different size of pin or box.

In the drawing:

Figure 1 is a longitudinal section of the improved fishing tool, the head being shown in elevation.

Figure 2 is a detail section illustrating the initial act of catching the pin of a lost sucker rod.

Figure 3 is a similar view illustrating the act of gripping the pin.

Figure 4 is a cross section taken on the line 4—4 of Figure 1.

Figure 5 is a cross section taken on the line 5—5 of Figure 1.

The instant invention is a direct improvement on the fishing tools or rod sockets of A. H. Neilson, disclosed in Patents 1,382,602 of June 21, 1921 and 1,433,146 of Oct. 24, 1922. Each of these patents is largely concerned with a slip of that design which will enable the catching of more than one size of pin, box or pipe. The instant application is confined to a fishing tool of the slip type, that form relating to the split ring being claimed in a division of this application filed Sept. 23, 1936, Serial No. 102,229.

Modern oil well engineering has developed much harder pins and boxes for sucker rod couplings, so that slips of the types in the patents with multiple wickers for catching various sizes of pins and boxes, are no longer as efficient as desired. In other words, the metal of the modern pins and boxes is made so hard that it is difficult to make multiple wickers bite deeply enough to obtain an effective hold.

The foregoing circumstance has brought with it the virtual necessity of requiring a slip for every size of pin and box to be fished, but this necessity is relieved by the provisions described below which make it possible to catch at least two sizes of fittings with one slip.

In Figure 1, the barrel 1, beveled entrance 2, internal threads 3 at the top and screwed in head 4 comprise known structure as does also the spring 5. The barrel 1 is thickest at the bottom (Fig. 1) where the beveled entrance 2 merges into an entrance bore 6. This bore terminates in an annular shoulder 7, providing an internal support, which is produced by a slight bore enlargement 8. The latter continues straight for a distance and then flares at 9 until it meets the normal bore 10.

The slip 11 which constitutes the principal feature of the invention is made in the form of a sleeve. This slip is reversible in the barrel 1. Either end can be made to point downward, and in order to reverse the slip it is only necessary to remove the head 4 and take out the parts.

The slip 11 is evenly expansible and contractible at both ends, for which purpose it has a plurality of slots 12, 13 cut in from the respective upper and lower ends. In the present instance three sets (Fig. 4) of the slots of each kind are shown. These slots divide the sleeve into a plurality of alternately oppositely directed gripper prongs 14, 15, either set of which can be brought into play to catch sucker rod fittings, depending upon the size involved.

This is governed by the internal shoulders 16, 17 respectively at the opposite ends of the sleeve. These shoulders are annular and have square inner ends as shown, but because of the fact that the slots 12, 13 cut through them they are, in a sense, yieldable shoulders because they are not annularly rigid. The shoulders are capable of opening and closing, and in doing so they catch the fitting. The internal diameter of the shoulder 16 is larger than that of the shoulder 17, hence 16 is adapted to catch a fitting that is larger than can be caught by the shoulder 17.

A washer 18 bears on the slip 11, transmitting the pressure of the spring 5 in either of the two positions of the slip. Since the ends of the slip terminate in fairly sharp edges it follows that the spring 5 must be supplied with a sufficiently ample base through which to transmit its pressure. The washer 18, although common and simple of itself, exactly serves the foregoing requirement. The upper end of this spring abuts the plug of the threaded head 4, as plainly shown.

The tendency of the spring is to force the slip 11 downwardly in the bore 10, past the flare 9 and into the entrance bore 8 where the end of the slip rests against the shoulder 7.

The operation is readily understood. Refer first to Figure 1. The slip 11 must be in contact with the shoulder 7 when the tool is lowered into the well. The fitting to be caught is the pin P of the sucker rod S (Fig. 2). The hub 29 of this pin is of a larger external diameter than the diameter of the internal shoulder 16, consequently when the tool is lowered in the direction of the arrow a (Fig. 2), the shoulder 16 will obstruct the hub 29 so that the hub will push the entire slip upwardly and inwardly in the direction of the arrow b. After the flare 9 is passed the slip 11 is free to expand, letting the shoulder 16 move below the hub 29 where it closes. Upon raising the tool (arrow c, Fig. 3) the flare 9 will wedge the prongs together at the lower free end of the slip as indicated by the arrows d by tending to crowd said free end into the entrance bore 8. The result is a very tight grip upon the lost fitting so that when the raising pull continues in the direction of arrow c the sucker rod S will come with the tool. Should the pin of the sucker rod have a hub of a smaller diameter than 29 it will be necessary to reverse the slip 11 so that the internal shoulder 17 can be brought into play in the manner already set out.

I claim:

1. A fishing tool comprising a barrel having an internal support and a slip inside of the barrel, said slip being evenly expansible and contractible at both ends and being reversible in the barrel, the ends of the slip having means for catching and holding sucker rod fittings of different sizes when the respective ends are rested on the internal support.

2. A fishing tool comprising a barrel having an internal support, and a slip in the barrel, said slip being annularly divided into a plurality of alternately oppositely directed sets of gripper prongs, said slip being reversible in the barrel to let either set rest on the internal support.

3. A fishing tool comprising a barrel having an internal support, and a slip in the barrel, said slip having internal shoulders at each end of different internal diameters, and being slotted in from each end, the slots going through the shoulders to divide the slip into a plurality of alternately oppositely directed sets of gripper prongs, said slip being reversible in the barrel so that either set can be rested on the internal support.

4. A fishing tool comprising a barrel having an internal support, and a slip in the barrel, said slip having internal shoulders at each end of different internal diameters, and being slotted in from each end, the slots going through the shoulders to divide the slip into a plurality of alternately oppositely directed sets of gripper prongs, said slip being reversible in the barrel so that either set can be rested on the internal support, and means through which to impose pressure upon said slip regardless of which of its two positions it is situated in.

ALBERT H. NEILSON.